Dec. 8, 1931.  E. H. KIDDER  1,835,059
CABLE CAR HAUL
Filed Nov. 13, 1929
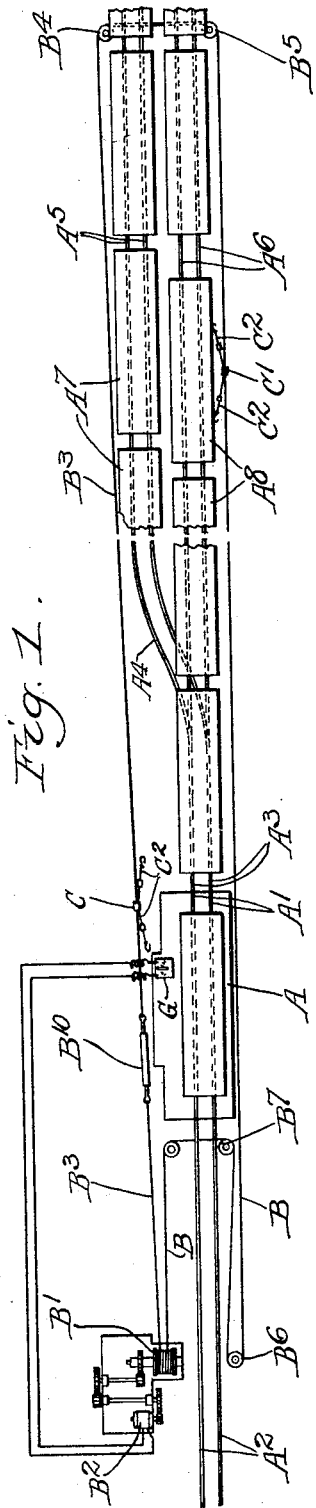
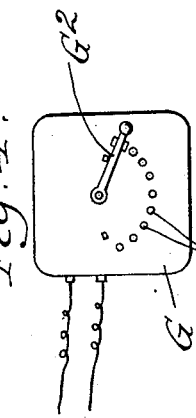
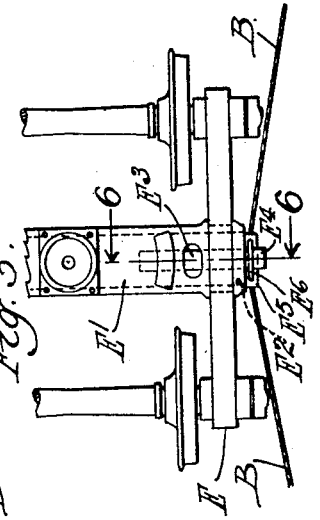
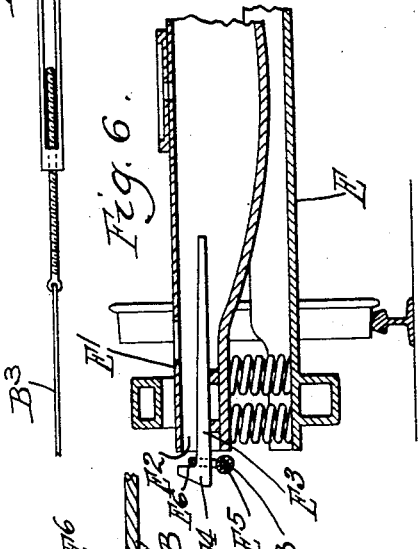
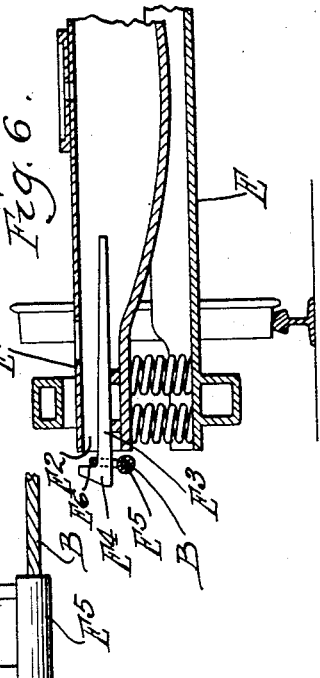
Inventor
Elwin H. Kidder
by Parker & Carter
Attorneys.

Patented Dec. 8, 1931

1,835,059

UNITED STATES PATENT OFFICE

ELWIN H. KIDDER, OF CHICAGO, ILLINOIS, ASSIGNOR TO LINK-BELT COMPANY, OF CHICAGO, ILLINOIS, A CORPORATION OF ILLINOIS

CABLE CAR HAUL

Application filed November 13, 1929. Serial No. 406,771.

My invention relates to improvements in cable car hauls and has for one object to provide a new and improved cable hauling method and system for freight cars and the like such as may be used in connection with car unloaders where successive cars must be moved forward and spotted in a position where they are to be loaded or unloaded or otherwise treated.

One object of my invention is to provide a cable car haul apparatus and process wherein a reciprocating cable may be used to feed cars forward and wherein there are two limbs to the cable so that cars on one of the pair of parallel tracks may be fed forward and wherein thereafter the cars on the second of the parallel pair of tracks may be fed forward, making it unnecessary to wait for the return movement of the cable.

Other objects of my invention will appear from time to time throughout the specification and claims.

My invention is illustrated more or less diagrammatically in the accompanying drawings wherein—

Figure 1 is a plan view of a layout for cars and cable illustrating my invention;

Figure 2 is a detail of the car and cable connection;

Figure 3 is a detail of the take-up;

Figure 4 is a diagrammatic showing of the controller;

Figure 5 is a partial top plan view of the freight car truck showing one method of making the connection to a freight car;

Figure 6 is a section along the line 6—6 of Fig. 5; and

Figure 7 is a detail.

A is a car dumper having a car track $A^1$ extending therethrough, but my invention may be used with a rotary or other types car dumper wherein the car is turned entirely over to dump its contents to a level lower than the track and it may be used for moving cars to or from a given point. $A^2$ is the discharge track extending from the dumper or point to which cars are moved to or from. $A^3$ is a single approach track along which cars may come on the way to the dumper. $A^4$ is a switch communicating at one end with the approach track $A^3$ and at the other with the storage tracks $A^5$ $A^6$ preferably arranged in parallel. $A^7$ $A^8$ indicate trains of cars located on the storage tracks $A^5$ $A^6$ which cars are to be moved.

B and $B^3$ are cables associated with a drum $B^1$ about which the cables are wound and a motor $B^2$ drives the drum, there being electric or other suitable controlling means, not here illustrated in detail, to control the operation of the motor. The cable $B^3$ extends from the drum along the track $A^5$ to a sheave $B^4$, thence across beneath the tracks $A^5$ and $A^6$ to a sheave $B^5$, thence back along the track $A^6$ past the car dumper or working station and along the tracks $A^3$ and $A^2$ to a sheave $B^6$, thence back to a sheave $B^7$ and thence back to the drum. Thus the cable has two separate parallel arms or branches, one extending from the engine to the sheave $B^4$, the other extending from the sheave $B^5$ to the sheave $B^6$. Attached to the cables B and $B^3$ are two separate car haul anchorages C, $C^1$. These car haul anchorages are positioned on the cables and so arranged that they do not pass around the sheaves, there being an anchorage for serving each track. It will be noted that their positions on the cables are such that when the anchorage C is at one end of its excursion, the anchorage $C^1$ is at the other end of its excursion, near the sheave $B^5$, and vice versa. Associated with these car haul anchorages C, $C^1$ are cables $C^2$, there being two for each anchorage, so that the anchorage may be attached at each end, or at two ends or a single point of any one of the cars. As illustrated the cables $C^2$ associated with the anchorage $C^1$ are attached to a car well up the track.

Ordinarily all the cars ahead of the one to which the anchorage $C^1$ is attached are coupled together, the car immediately following the anchored car is uncoupled and all the remaining cars are coupled together so that when anchorage $C^1$ is later attached to the first car of the second half, all the remaining cars are moved forward to where the anchorage $C^1$ can be attached to the last car. The first half of the cars on the track 5 are handled by anchorage C in the same manner described for anchorage $C^1$. When the first half of cars on tracks $A^6$ and $A^5$ have been delivered to track $A^1$, anchorage $C^1$ is at or near the first of the second half of cars on track 6, so it may by a slight further travel up the track be attached to the first of the second half of the remaining cars to be placed on track $A^1$. In the meantime the anchorage $C$ has moved up the track and is ready to be attached to the first of the second half of cars on track $A^5$ and move them on track 5 to switch $A^4$ and then be detached. As anchorage $C$ moves to $A^4$ anchorage $C^1$ has moved up $A^6$ the same amount and by further movement, equal to the distance between the junction of tracks $A^1$ and $A^3$ and the junction of tracks $A^4$ and $A^5$, up track $A^6$ when anchorage $C^1$ is ready to attach to rear car and move them forward as desired. When $C^1$ has delivered the last car onto $A$, anchorage $C$ is at or near the last car on track $A^5$ ready for attaching and feeding the remaining cars to $A^1$. Ordinarily there are a few less cars serviced from track $A^5$ than from $A^6$ due to the switch.

The haul may be made sufficiently strong to move all the cars on a track at one time when they are coupled together, by attaching anchorage $C^1$ to the middle car, all those preceding it are moved on track $A^6$ to a point opposite junction of tracks $A^5$ and $A^4$ when the adjoining rear half of the cars is uncoupled and the cars ahead of it including the middle car or car attachment is delivered onto $A^1$. In the meantime anchorage $C$ is ready to attach to the middle car on track $A^5$ and move all of the cars forward until the rear of the car to which anchorage is attached, reaches junction of tracks $A^4$ and $A^5$ when the rear half of the cars is uncoupled and the balance of the cars are moved onto $A^1$. In the meantime $C^1$ has moved up the track the same amount and by further movement, equal to the distance between junction of tracks $A^1$ and $A^3$ and junction of switch $A^4$ to track $A^5$, up track $A^6$, anchorage may be attached to rear car and move it and the preceding cars forward as desired. When $C^1$ has delivered its last car onto $A^1$, anchorage $C^1$ is at or near the last car on $A^5$ ready for attaching and feeding it and the preceding cars onto $A^1$. Obviously there are other ways in which a haul as shown may be used to handle cars of various numbers.

D is an adjusting clamp associated with each cable $C$ to permit adjustment for cars of varying lengths.

Referring to Figures 5, 6, and 7, E generally indicates a usual freight car truck structure with the transverse element $E^1$ having a side aperture $E^2$ into which may be thrust a pin $E^3$ with a head $E^4$. $E^5$ indicates a splice on the cable B and $E^6$ an eye associated with the splice. In order to make the connection with a car the pin $E^3$ may be thrust through the eye $E^6$ and into the aperture $E^2$. The head $E^4$ will not pass through the eye $E^6$. Since the tension on the cable is exerted along an axis or line parallel with the line of movement of the car, there is no tendency for the withdrawal of the pin $E^3$, which is cramped against the sides of the aperture into which it is inserted. This method of attachment has the advantage of simplicity and quickness, as the pin may be inserted or withdrawn almost instantaneously.

The use and operation of my invention are as follows:

Maximum efficiency in moving cars can be attained only when served with an efficient car haul and when the labor costs are reduced to a minimum. It is also necessary to be able to reach with the car haul a maximum number of loaded cars with a minimum delay and without the use of switching service. As a matter of fact it is preferable to have a storage system with a car haul so that the haul itself may feed to the dumper or unloader at least a half day's supply of cars without requiring a switch engine to provide an additional supply of cars.

This purpose is accomplished by means of a car haul system, consisting of a reversible single drum, which drum is scored so that cables enter and leave it on opposite sides, thereby paying out and taking up the same amount of cable as the drum is operated. The cable $B^3$ extends from a drum $B^1$ to a point slightly past the center of the loaded car storage space. It is deflected under the tracks and extends back in the direction toward the drum to a point somewhat past the unloader so as to always render it capable of pulling the last car off the unloader after it has been emptied of its load. From this point it is deflected beneath the track and then back to the drum.

This gives a cable with two branches, one moving in opposition to the other. As arranged with the two parallel car tracks there is one branch of the cable associated with each pair of rails. When one cable is coming forward and may be used to feed cars to the unloader, the other cable will be going back idle. Figure 2 shows one form of attachment with two short cables $C^2$ fastened to each anchorage.

The adjusting clamp D as shown makes it possible to change the length of these cables so that the pair of cables may be fastened to a single car and may be used to move it forward or back as the case may be. The long screw take-up $B^{10}$ is necessary to take up slack in the hauling cable.

The electric controller G for the car haul, may be located at the car unloader operator's platform and may be similar to an ordinary street car controller with contacts $G^1$ and the manually operable arm $G^2$. The helper attaches the anchorage to the cars previously described. The attachments when not fastened to cars are free to drag along the ground. The operator moves the controller to cause the drum B¹ to reel in on the attached cable, and the entire train of cars ahead of the anchorage moves forward until a loaded car is spotted on the unloader. The operator's helper uncouples this car from the others and the operator, by reversing the controller, pulls the remaining cars back to a point clear of the unloader. The car is then unloaded or otherwise treated and the operator works his controller to move another car onto track A, pushing the empty car off. This continues until the last car in the string has been placed. By this time the other cable anchorage has been moved back to the other end of its excursion. The helper attaches it to a car, and the process is reversed, by causing the cables to move in the opposite direction, to feed cars from the second track onto track A.

By this arrangement and by keeping all the cars on each track coupled in train, it is possible for the car haul to feed a maximum number to track A with minimum delay, labor and manipulation, because when one anchorage of the car haul reaches track A, the other anchorage is at or near the far limit of its movement, ready to be attached to a car.

In many of the claims I refer to the process of feeding cars as associated with a car unloader and refer to the unloader in the body of the claim. Obviously this is done for convenience only and in order to make clear what I am doing and how the process is carried on. The car haul and the process of operating and using it can, of course, equally well be used for moving cars for any purpose and I want it understood that where I refer to a car unloader or car dumper I use it merely as exemplifying both in specification and claims any device where cars are successively moved and spotted.

I claim:

1. The process of feeding cars to car unloaders and the like, which consists in coupling a series of cars in trains on parallel lines, then selecting a car in one train and propelling it toward the unloader to push the cars ahead until the leading car in the train is spotted on the unloader then uncoupling the leading car, then propelling the selected car backward to move the train back to clear the unloader, then after the spotted car has been unloaded, propelling the selected car forward to push the empty car off the unloader and spot the next car in the train thereon and continuing the process until the selected car has reached the forward limit of its excursion, then selecting a similar car in the other train and repeating the process with it.

2. The process of feeding cars to car unloaders and the like which consists in assembling a series of cars coupled in train, then selecting an intermediate car in the train and applying power to that car to propel it toward the unloader and push the cars in front and pull the cars behind it in the train until the leading car in the train is spotted on the unloader, then uncoupling such leading car and applying power to the selected car to reverse the train to clear the unloader, then after the car on the unloader has been unloaded, applying power to the selected car to move the entire train forwardly, push the empty car off the unloader and spot another car thereon, then withdrawing the train to clear and continuing the process until the selected car has reached the forward limit of its excursion.

3. The process of feeding cars to car unloaders and the like, which consists in providing a series of cars coupled in trains in parallel lines, then selecting an intermediate car in one train and propelling it toward the unloader to push the cars in front and to pull the cars behind it until the leading car in the train is spotted on the unloader, then reversing the selected car to move the train back to clear the unloader, then after the spotted car has been unloaded, propelling the selected car forward to push the empty car off the unloader and spot the next car in the train thereon and continuing the process until the selected car has reached the forward limit of its excursion, then selecting a similar intermediate car in the other train and repeating the process with it.

4. The process of feeding cars to car unloaders and the like, which consists in providing a series of cars coupled in trains in parallel lines, then selecting an intermediate car in one train and propelling it toward the unloader to push the cars in front and to pull the cars behind it until the leading car in the train is spotted on the unloader, then withdrawing the selected car to move the train back to clear the unloader, then after the spotted car has been unloaded propelling the selected car forward to push the empty car off the unloader and spot the next car in the train thereon and continuing the process until the selected car has reached the forward limit of its excursion, then selecting a similar intermediate car in the second train and repeating the process with it, then selecting a car in the remainder of the first train and carrying out the process as before.

5. The process of feeding cars to car unloaders and the like, which consists of providing a series of cars coupled in trains in parallel lines, then selecting an intermediate car in one train and propelling it toward the unloader to push the cars in front and to pull the cars behind it until the leading car in the train is spotted on the unloader, then withdrawing the selected car to move the train back to clear the unloader, then after the spotted car has been unloaded propelling the selected car forward to push the empty car off the unloader and spot the next car in the train thereon and continuing the process until the selected car has reached the forward limit of its excursion, then selecting a similar intermediate car in the second train and repeating the process with it, then selecting a car in the remainder of the first train and carrying out the process as before, then selecting another car in the other train at about the same distance from the unloader as the first selected and repeating the process.

6. The process of feeding cars which consists in arranging a series of cars in parallel trains, then selecting a car in one train and propelling it forward toward a working station to push ahead of it the other cars in the train until the leading car is spotted at the working station, then after the spotted car is ready to move, propelling the selected car forward to push all the cars in the train ahead until the next car is spotted at the working station and continuing the process until the selected car has reached the forward limit of its excursion, then selecting a similar car in the other train and repeating the process with it.

7. The process of claim 6 characterized by the fact that the cars in the train are coupled together the spotted car only being uncoupled and that after a car has been spotted the selected car is reversed to draw the train back with it to clear the spotted car.

8. The process of claim 6 characterized by the fact that the selected car is intermediate the ends of the train and that as that car moves forward the cars both in front and behind it move with it.

Signed at Chicago, county of Cook and State of Illinois, this 8th day of October, 1929.

ELWIN H. KIDDER.